United States Patent
Hays et al.

(10) Patent No.: US 9,991,984 B2
(45) Date of Patent: Jun. 5, 2018

(54) SIGNAL CODING FOR IMPROVED SPECTRAL QUALITY

(71) Applicants: Nathan Hays, San Francisco, CA (US); David Asson, Sisters, OR (US)

(72) Inventors: Nathan Hays, San Francisco, CA (US); David Asson, Sisters, OR (US)

(73) Assignee: Terrace Communications Corporation, San Francisco, CA (US)

( * ) Notice: Subject to any disclaimer, the term of this patent is extended or adjusted under 35 U.S.C. 154(b) by 0 days. days.

(21) Appl. No.: 15/249,247

(22) Filed: Aug. 26, 2016

(65) Prior Publication Data
US 2017/0111135 A1    Apr. 20, 2017

Related U.S. Application Data

(60) Provisional application No. 62/210,949, filed on Aug. 27, 2015.

(51) Int. Cl.
| | |
|---|---|
| *H04B 1/00* | (2006.01) |
| *H04J 13/00* | (2011.01) |
| *H04B 17/13* | (2015.01) |
| *H04J 13/10* | (2011.01) |
| *H04L 12/933* | (2013.01) |

(52) U.S. Cl.
CPC .......... *H04J 13/0044* (2013.01); *H04B 17/13* (2015.01); *H04J 13/102* (2013.01); *H04L 49/1584* (2013.01)

(58) Field of Classification Search
CPC .... H04J 13/0044; H04J 13/12; H04J 13/0048; H04J 13/18; H04J 13/0066; H04J 11/00; H04J 13/004; H04J 13/10; H04L 5/0064; G06F 1/0255
USPC .................. 375/130, 145, 134; 714/786, 781
See application file for complete search history.

(56) References Cited

U.S. PATENT DOCUMENTS 7,609,749 B1 * 10/2009 Hall ........................ H04J 13/12
                                                                    370/208

* cited by examiner

*Primary Examiner* — Rahel Guarino
(74) *Attorney, Agent, or Firm* — Trellis IP Law Group, PC

(57) ABSTRACT

A satellite communications system can use a spread-spectrum waveform and format, a synchronization scheme, and/or a power management algorithm. This approach can provide benefits such as allowing every terminal to communicate with every other terminal, link margin permitting. This gives the network a mesh topology although it can be configured in a star topology for highly asymmetric applications. A further understanding of the nature and the advantages of particular embodiments disclosed herein may be realized by reference of the remaining portions of the specification and the attached drawings.

5 Claims, 5 Drawing Sheets

FIGURE 6

SIGNAL CODING FOR IMPROVED SPECTRAL QUALITY

CLAIM OF PRIORITY

This application claims priority from U.S. Provisional Patent Application Ser. No. 62/210,949, entitled SIGNAL CODING FOR IMPROVED SPECTRAL QUALITY, filed on Aug. 27, 2015, which is hereby incorporated by reference as if set forth in full in this application for all purposes.

CROSS REFERENCES TO RELATED APPLICATIONS

This application is related to the following U.S. Patents, each of which is incorporated by reference as if set forth in full in this document for all purposes:
1. U.S. Pat. No. 8,009,723 issued Aug. 30, 2011
2. U.S. Pat. No. 7,912,492 issued Mar. 22, 2011
3. U.S. Pat. No. 8,018,906 issued Sep. 13, 2011
4. U.S. Pat. No. 9,083,445 issued Jul. 14, 2015
5. U.S. application Ser. No. 14/798,142 filed Jul. 13, 2015

SUMMARY

A satellite communications system can use a spread-spectrum waveform and format, a synchronization scheme, and/or a power management algorithm. This approach can provide benefits such as allowing every terminal to communicate with every other terminal, link margin permitting. This gives the network a mesh topology although it can be configured in a star topology for highly asymmetric applications. A further understanding of the nature and the advantages of particular embodiments disclosed herein may be realized by reference of the remaining portions of the specification and the attached drawings.

BRIEF DESCRIPTION OF THE DRAWINGS

FIG. 5 shows a 256-QAM;
FIG. 6 shows a 16-QAM.

DETAILED DESCRIPTION OF EMBODIMENTS

Figure 1:
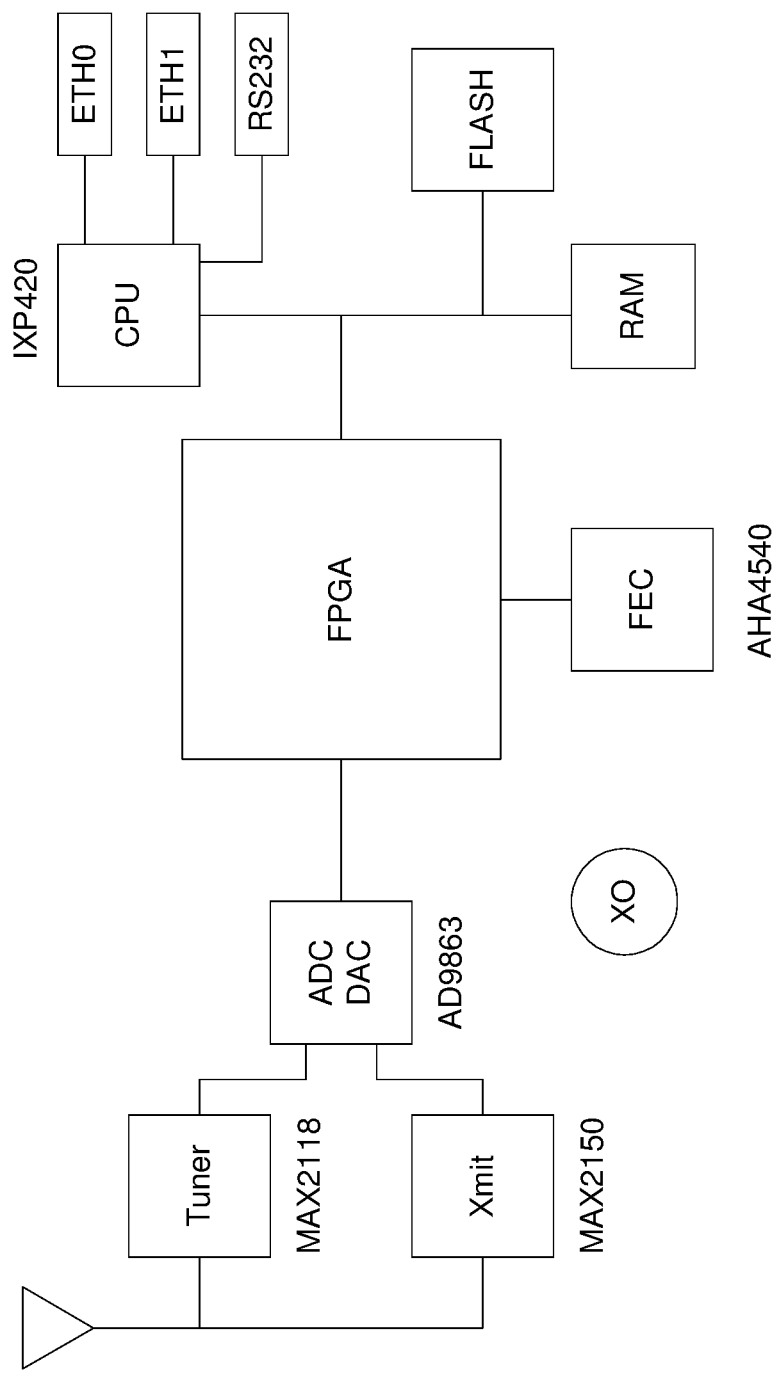
FIG. 1 shows a modem block diagram.

FIG. 1 shows the major blocks of a transceiver in a modem block diagram. Although specific features, implementations, components and other design choices are presented herein it should be apparent that other designs are possible and can be within the scope of the invention. In a particular embodiment, the transceiver includes an RF chain, A/D converters, and a digital demodulator in an FPGA. The FEC is handled by a Turbo Product Code chip. The CPU handles the TCP/IP stack and router functionality.

The Tuner is based on a MAX2118 L-Band tuner IC. This IC takes in 925 MHz to 2175 MHz and down-converts to baseband using an onboard oscillator and mixer. The oscillator is locked to an external reference. The baseband signal is further filtered by a programmable rate LP filter.

The transmitter is based on a MAX 2150 L-Band transmitter IC. This IC takes in quadrature signals and up-converts them to 700 MHz to 2300 MHz output. The IC also includes a fractional-N synthesizer for use with an external crystal and reference oscillator. The AD9863 dual ADC/DAC performs differential conversion for both the transmit and receive sections. The ADC runs at 48 MHz by 12 bits times two channels. The DAC runs at 192 MHz by 12 bits times two channels. The DAC section also includes a LP interpolation filter for running at lower rates.

The FPGA is based on an Altera Cyclone II. In the embodiment being described, this IC is programmed to perform all modem related circuitry. In general, any suitable processing approach (including any combination of one or more of hardware, firmware, software; analog, optical, digital processing; etc.) can be used to implement the processing functions and techniques described herein.

The CPU is based on an Intel IXP422 Network Processor. This IC contains a Strong-ARM core, dual MACs, PCI interface, and encryption support for 3-DES and AES. The CPU runs under an embedded Linux kernel. The kernel is booted from flash and runs in RAM. The FEC is performed by an AHA4540 Turbo Product Code IC. The system clocks are derived from a 10 MHz TCXO that is synchronized with the network. Naturally, other frequencies and types of clocking and synchronizing may be used in accordance with design choices for a particular implementation.

Figure 2:
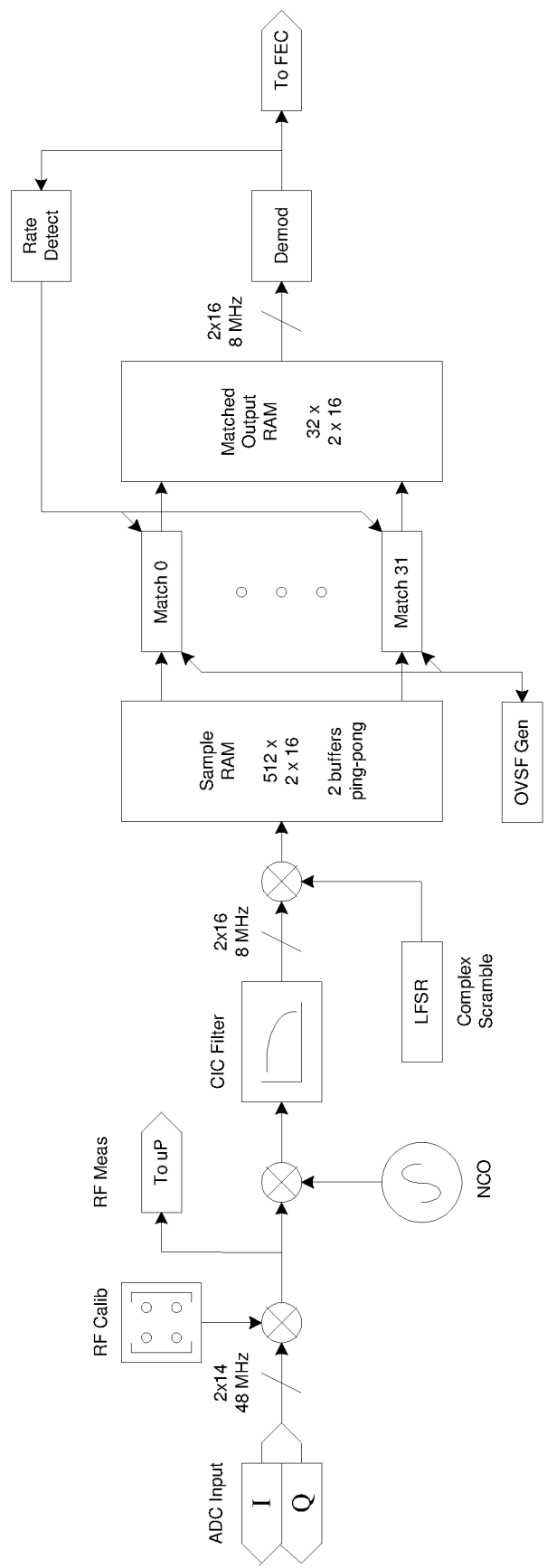
FIG. 2 shows sections of an FPGA receiver.

Continuing with the example embodiment, FIG. 2 shows sections of the FPGA receiver. The signal from the diplexor is down-converted to baseband by the MAX2118 tuner IC. Because of the selectivity of this particular tuner and the frequency offset of the Ku LNB the baseband signal may be off by as much as 100 KHz. The MAX2118 also includes a VGA for keeping the signal in range. An on-chip filter provides a first level bandpass to eliminate aliasing in the ADC process.

The AD9863 ADC samples the baseband I and Q signals at a multiple of the chip rate. For example, an 8 Mcps signal can be sampled at 48 MHz. The output is presented to the FPGA as two 12-bit streams.

The FPGA can perform the following operations on the signal path:
Measure and correct the RF impairments (DC offset, I/Q Gain, and phase error);
Tune the baseband to true DC;
Decimate and filter to the desired sample rate;
Complex de-scramble of the outer code;
De-spread sub-channels;
Demodulate sub-channels; and
Send demodulated cells to the TPC FEC IC.

The RF impairments can include DC offset, I/Q gain imbalance, and phase error. The FPGA has circuitry to measure these impairments and correct them. The CPU periodically reads the impairment measurement registers, calculates a closed-loop correction value, and writes the correction factors to the correction matrix registers.

A DC offset is measured by taking an average of the input I and Q channels. The DC error is given by the averages. The I/Q gain imbalance is measured by averaging the absolute value of the I and Q channels and then calculating their difference. The result is the gain error. The phase error is measured by first rotating the input by 45 degrees then performing the same measurement as the I/Q gain imbalance.

The error outputs are fed to control loops to generate correction factors. These factors are combined into a 2×2 correction matrix and an offset vector. Each sample input vector to the FPGA is first added to the offset vector and then multiplied by the correction matrix.

The Ku LNB and the Tuner IC are unable to completely tune the signal to true DC baseband. The final stage is accomplished by a numeric oscillator and digital mixer. As much as 100 KHz of offset must be accommodated in the digital tuner.

The operations to implement both RF impairment and Tuning are:

$$I_{ac} = I_{in} \text{Offset}_I$$

$$Q_{ac} = Q_{in} \text{Offset}_Q$$

$$I_{corrected} = I_{ac} \text{Skew}_{11} + Q_{ac} \text{Skew}_{12}$$

$$Q_{corrected} = I_{ac} \text{Skew}_{21} + Q_{ac} \text{Skew}_{22}$$

$$I_{out} = I_{corrected} NCO_{cos} - Q_{corrected} NCO_{sin}$$

$$Q_{out} = I_{corrected} NCO_{sin} + Q_{corrected} NCO_{cos}$$

The output of the digital tuner is decimated and filtered to produce the true baseband chip stream. The filter includes equalization for the Tuner IC, the decimator, and RRC shaping. The output is a pair of 16-bit streams at the chip rate.

Continuing with the example embodiment, the signal is scrambled by an outer code to improve the spectral quality and to limit chip to chip transitions to 90 degrees. The de-scrambler is fed by a Linear Feedback Shift Register (LFSR) and one extra bit. This brings the total descramble period to the same as that of the OVSF code set. For example, if the OVSF code set is 512 chips long, an LFSR of 9 bits will produce a 511 chip output sequence. An extra '1' is added to the beginning of the stream and synchronized with the OVSF code sequence.

Alternatively, the LFSR can be made to have an extremely long period on the order of days to provide a very strong security feature. In this case, higher level protocols are used to decide on the LFSR taps and likely current state of the register.

During signal acquisition, the extra bit is not enabled. This creates a sliding match filter when searching for the all zeros OVSF code. Signal acquisition is covered in another section.

Because there are not enough gate resources to simultaneously match every code in the OVSF set, matching is done at a much higher rate than the chip rate. This requires a bank of match filters and a buffer to hold the samples during each pass with a match filter bank.

For example, in an 8 MHz chip rate system and a 512 spreading length, 32 match filters operating at 16× clocking will run at a clock rate of 128 MHz. The sample buffer is loaded with 512 samples at 8 MHz and when full, the match filter bank is run on the data set to produce 32 symbols of output. The data is then re-run through the filter banks with a new set of OVSF codes. This is done 16 times to produce all 512 symbol streams.

While the filter bank is being run on one set of data, a ping pong buffer is being filled with a new set of data.

The channel is capable of operating with a chip rate of 1 Mcps to 8 Mcps. The spreading rate should be capable of up to 512 or 1024 chips. The system is synchronous, so there is no need for oversampling in the match filter.

There are two parts to the match filter, the chip generators and the symbol accumulators. The chip generators produce streams of bits, one stream per slot. The symbol accumulators form a complex sum of products, one sum for each slot. Because this is a synchronous system, the accumulators are all flushed at the same time—the data bits are synchronous.

The system also supports variable data rates, both by varying the bit constellation and by varying the spreading rate. The constellation may be QPSK, 16-QAM, or 256-QAM. The spreading rate is varied by using an Orthogonal Variable Spreading Factor (OVSF) basis. The OVSF basis is used to produce spreading rates of 1/1, ½, ¼, or ⅛ of the full rate. These two variables allow a 15 dB range of data rates.

For example, assuming an 8 Mcps system with a 1024 basic spreading rate, QPSK modulated data runs at 16 kbps while a ⅛ spread with 256-QAM runs at 500 kbps. Both of these transmissions can be in the same channel and will have no MAI between them.

The chips may be described as a matrix of zeros and ones with each row belonging to a slot and the columns belonging to a point in the spreading sequence. The matrix is formed first by filling it with the OVSF pattern. This pattern ensures perfect orthogonality and the ability to use variable spreading rates. However, the OVSF waveforms do not have good spectral properties. To mitigate this, a sequence having good spectral properties is exclusive ORed with each row of the matrix.

As an example, the 8×8 OVSF matrix is:

$$O_8 = \begin{bmatrix} 0 & 0 & 0 & 0 & 0 & 0 & 0 & 0 \\ 0 & 0 & 0 & 0 & 1 & 1 & 1 & 1 \\ 0 & 0 & 1 & 1 & 0 & 0 & 1 & 1 \\ 0 & 0 & 1 & 1 & 1 & 1 & 0 & 0 \\ 0 & 1 & 0 & 1 & 0 & 1 & 0 & 1 \\ 0 & 1 & 0 & 1 & 1 & 0 & 1 & 0 \\ 0 & 1 & 1 & 0 & 0 & 1 & 1 & 0 \\ 0 & 1 & 1 & 0 & 1 & 0 & 0 & 1 \end{bmatrix}$$

By inspection one can notice that the sequences can all be produced from a 3-bit counter and some XOR logic. For long spreading codes (1024), this may be a prohibitive amount of logic. Alternatively, the hits can be stored in RAM.

Note that each row of $O_8$ is orthogonal to the others. This can be shown by forming $O_N^T \times O_N$ (use boolean multiplication—XOR) which produces $N \times I_N$ where $I_N$ is the N×N unity matrix. The variable spreading rate properties will be covered later.

The poor spectral quality of the OVSF matrix can be seen by looking at the first and the fourth rows, both of which have a single pure frequency. To fix this, we create a code with good spectral properties and XOR it with each row. Such a code can be formed using an M-sequence of length N−1 and pre-pending a 1. M-sequences are easy to produce using a linear feedback shift register (LFSR). An example of length 8 is:

$$M = [1\ 1\ 1\ 0\ 0\ 1\ 0\ 0]$$

When XORed into the OVSF matrix the result is:

$$O_8 \otimes M = \begin{bmatrix} 1 & 1 & 1 & 0 & 0 & 1 & 0 & 0 \\ 1 & 1 & 1 & 0 & 1 & 0 & 1 & 1 \\ 1 & 1 & 0 & 1 & 0 & 1 & 1 & 1 \\ 1 & 1 & 0 & 1 & 1 & 0 & 0 & 0 \\ 1 & 0 & 1 & 1 & 0 & 0 & 0 & 1 \\ 1 & 0 & 1 & 1 & 1 & 1 & 1 & 0 \\ 1 & 0 & 0 & 0 & 0 & 0 & 1 & 0 \\ 1 & 0 & 0 & 0 & 1 & 1 & 0 & 1 \end{bmatrix}$$

Note that this compound matrix is again orthogonal and that the spectral properties are better. In general, the longer the spreading length, the better the spectral 'fix'. The technique can apply to any poor spectral quality signal. Poor spectral quality in this case occurs when a large portion of the energy of a symbol is concentrated in one or a few tones. A more desirable (i.e., "improved") spectral quality occurs when such energy is more evenly divided among an increased number of tones. Spreading the energy across a larger bandwidth is the point of spread spectrum and leads to a number of benefits such as better dynamic range in the receiver and transmitter, lower probability of detection, meeting mandated spectral density limits, noise immunity, and others.

The use of an LFSR to generate the outer code is efficient but other approaches may also be used. A search could be made across all possible sequences for a sequence that produces the best spectral quality. An arbitrary sequence could also be used but would require more hardware resources. The choice between determining better codes using more resources is a matter of design choice. The length of the sequences must be taken into account. For example, for longer sequences it could take too long to exhaustively search for better codes.

The OVSF matrix is a reordered version of a Hadamard matrix. One way to form a Hadamard matrix is by the following recursive algorithm:

$$H_1 = [0], H_{2n} = \begin{bmatrix} H_n & H_n \\ H_n & \sim H_n \end{bmatrix}$$

Thus, $$H_2 = \begin{bmatrix} 0 & 0 \\ 0 & 1 \end{bmatrix}, H_4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix},$$

$$H_8 = \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix}, \text{etc} \ldots$$

The OVSF matrices can also be defined by the following recursive algorithm. The notation $O_N(i)$ indicates the ith row of $O_N$.

$$O_1 = [0], O_{2n} = \begin{bmatrix} O_N(1) & O_N(1) \\ O_N(1) & \sim O_N(1) \\ O_N(2) & O_N(2) \\ O_N(2) & \sim O_N(2) \\ \vdots & \vdots \\ O_N(N-1) & O_N(N-1) \\ O_N(N-1) & \sim O_N(N-1) \\ O_N(N) & O_N(N) \\ O_N(N) & \sim O_N(N) \end{bmatrix}$$

Thus, $$O_2 = \begin{bmatrix} 0 & 0 \\ 0 & 1 \end{bmatrix}, O_4 = \begin{bmatrix} 0 & 0 & 0 & 0 \\ 0 & 0 & 1 & 1 \\ 0 & 1 & 0 & 1 \\ 0 & 1 & 1 & 0 \end{bmatrix},$$

$$O_8 = \begin{bmatrix} 0 & 0 & 0 & 0 & 0 & 0 & 0 & 0 \\ 0 & 0 & 0 & 0 & 1 & 1 & 1 & 1 \\ 0 & 0 & 1 & 1 & 0 & 0 & 1 & 1 \\ 0 & 0 & 1 & 1 & 1 & 1 & 0 & 0 \\ 0 & 1 & 0 & 1 & 0 & 1 & 0 & 1 \\ 0 & 1 & 0 & 1 & 1 & 0 & 1 & 0 \\ 0 & 1 & 1 & 0 & 0 & 1 & 1 & 0 \\ 0 & 1 & 1 & 0 & 1 & 0 & 0 & 1 \end{bmatrix}, \text{etc} \ldots$$

Figures 3, 4:
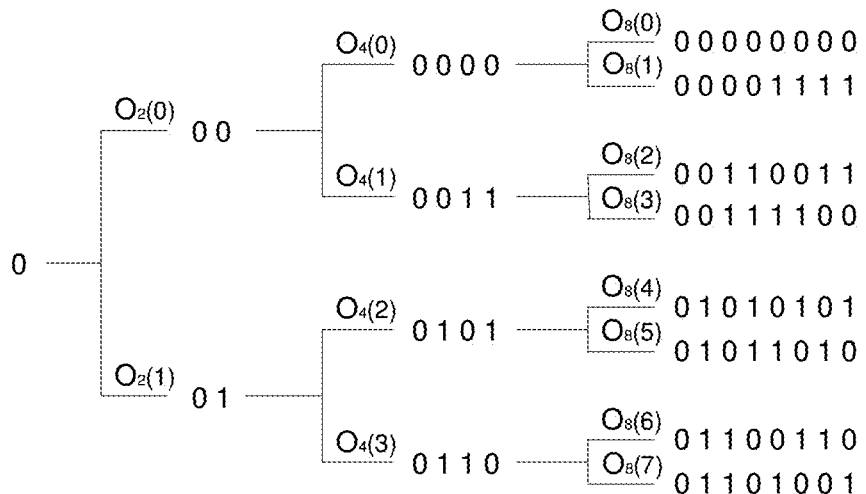
FIG. 3 shows a tree illustrating spreading rates.
FIG. 4 shows spreading rate handling.

This can be conveniently represented as a tree, illustrated in FIG. 3, which also shows how the variable spreading rates are achieved.

All of the codes in O8 are orthogonal. Note also that code O4(0) is orthogonal to all codes except O2(0), O8(0), and O8(1). Thus, if a transmitter is assigned a higher rate code, all lower rate codes that derive from the same branch are blocked. These properties persist through the spectrum fixing operation detailed earlier.

Each column of the OVSF matrix can either be produced on the fly or read from RAM once each chip clock. The spectrum fixing overlay can also be produced one bit per chip clock. On each clock, the overlay bit is XORed with the entire column of the OVSF generator. The resulting streams of bits are used by the accumulators to de-spread the transmissions. In a particular embodiment, the variable rate feature is implemented in the accumulator state machine.

The modulation scheme includes a first mapping input data bits to a constellation of 2, 4, 6, or 8 bits. The symbols so formed are then spread by a pure phase-shift keying sequence, either advancing or retarding ninety degrees per chip time according to the spreading code. This way, the transmitter spends most of its time at constant amplitude and only changes on a symbol boundary. This greatly reduces the stress on the power amplifier.

What this means for the match filter is that the accumulators do not multiply the input samples by +/−1, but perform a complex rotation instead. In order to efficiently use logic resources, the accumulators are individually rotated according to their spreading codes, added to the latest sample, and fed back into the accumulators.

The transformations are given by:

$$A_i(n+1) = \begin{cases} A_i(n) \cdot \begin{bmatrix} 0 & 1 \\ -1 & 0 \end{bmatrix} + S(n), & \text{chip} = 0 \\ A_i(n) \cdot \begin{bmatrix} 0 & -1 \\ 1 & 0 \end{bmatrix} + S(n), & \text{chip} = 1 \end{cases}$$

The accumulators are cleared at the start of a symbol and once the spreading sequence is exhausted, the outputs are fed to the demodulators. The variable rate circuitry does not change the timing of the clearing/flushing cycles.

Variable Rate Match Filter

In order to reduce the impact of variable rates on receiver complexity, it is better to devise a system whereby the accumulators continue to operate with the same low symbol rates, but only accumulate when an enable signal is true. For example, when a transmitter is operating with O4(0), an enable signal can cause A8(1), and A8(0) to only accumulate the first four and last four samples respectively. Thus the transmitter is seen as two independent streams. With a properly pre-formatted transmission, the receiver needs only implement an enable signal and associated state machine to demodulate variable rates.

In one embodiment, because the receiver does not know a priori what spreading rate will be used, the cell preamble includes data to let the match circuitry change operating modes in mid-cell. Once the demodulator has detected the rate field, the match filter is reconfigured.

There is a simple means for the accumulators to operate with a constant symbol rate but handle a variable spreading scheme. This is accomplished by a set of enable signals that only allow accumulations to occur on specific chips. The cell's rate field along with the accumulator index dictates which enable signal to use. The tree diagram of FIG. 4 shows several spreading rates being handled by different branches in the OVSF tree.

The first column is the index of the accumulator. The next four columns show the evolution of the Hadamard matrix generation of the 16-bit system of this example. The sixth column is the spreading code used by the associated accumulator. The next field indicates how to generate the code from the accumulator index. The final field indicates how to generate the enable signals.

Each color represents a different transmission rate. The colored portions of the 16-bit spread sequences are the chips that are enabled for the sequences' accumulators. Once each accumulator has selected the appropriate enable signal, it will only correlate the bits for its symbol. Note that the variable rates are available to all accumulators in their respective groups. For example, there are two 8× groups, '00' and '01'.

The spreading codes are generated according to the 'Gen.' column. A '1' indicates that the chip counter bit is included in an XOR. For example, the spreading sequence for the eleventh accumulator is given by:

$$G_A = b_0 \oplus b_2$$

The enable signals are simple to produce from the chip counter. In this example the chip counter has 4 bits. The bits of the counter and their inverses are XORed together in various combinations to produce the 15 enable signals. These 15 signals are all that are required for variable rates of 1×, 2×, 4×, and 8× the lowest spreading rate, independent of the total length of the longest code.

In the table the enable field indicates which bits of the chip counter are XORed to produce the enable for that accumulator. The counters bits indicated are lsb left, msb right. A period indicates that the bit is ignored for that rate. A '0' indicates the bit is included in the XOR and a '1' indicates its inverse is included. For example, the enable signal for the eleventh accumulator operated at an 8× rate is created by:

$$E_{A,8\times} = b_1 \oplus \overline{b_2} \oplus b_3$$

It should be clear that the senses of the bits to include in the XOR are dictated by the index of the accumulator while the number of bits is indicated by the rate.

AGC

During the preamble of a frame, each receiver channel must determine the AGC value. Because all of the preamble data is 4-Qam, the amplitude of every bit is the same. A simple control loop will drive this amplitude to a set point value that will then be held during the payload portion of the frame.

Phase Tracking

Phase tracking is accomplished by multiplying the input samples by an oscillator. The oscillator frequency is controlled to minimize phase error by a control loop taking a phase error estimate in.

There are four regimes in which the phase tracking loop must operate:

1. First sample of AGC field.

The first approximation of the oscillator angle is determined by a direct measurement of the quadrant in which the first symbol falls. The oscillator is set to the midpoint of that quadrant (one of four values).

2. Subsequent samples in the AGC field.

During the AGC field, the phase error is a combination of a 4-Qam phase table value and a determination of the rotated sample octant. The idea is to use a table that has +/−45 degrees for accommodating errors as large as +/−180 degrees. The AGC field symbols are all identical (0,0), so this is appropriate.

The rotated sample's octant will determine the most significant bits of the phase angle and whether the least significant bits read from the table should be added or subtracted.

The phase table to use is the same as for the 256-Qam demod. That table has 8 bits to describe +/−45 degrees. This is needed during the preamble to track phase fine enough so that when the payload field is entered the phase is accurate enough for 256-Qam demod.

3. Interleave, ModRate fields.

Data in the final fields of the preamble are 4-Qam modulated and therefore the phase error will be in the range of +/−45 degrees. No adjustment as in the AGC tail for 180 degrees is needed. The same table as in the previous field is used.

4. Payload, 4, 16, 64, and 256-Qam.

There is a different table for each of these mod rates. In the case of 256-Qam, the table doubles for preamble and payload uses. For the payload, only the least significant 4 bits are used to determine phase error.

The phase tracking tables are a part of the soft error demod tables. Their sizes and field definitions are all different:

4-Qam: Addressed by most significant 5 bits each of Q then I. The table has 1024 32-bit entries. Each entry has an 8-bit field for 2×4-bit soft data values and an 8 bit value for the phase error. Two bytes are unused 16-Qam: Addressed by the most significant 6 bits each of Q then I. The table has 4192 32-hit entries. Each entry has two bytes for 4×4-hit soft data and an 8 bit value for the phase error. One byte is unused.

64-Qam: Addressed by the most significant 7 bits each of Q then I. The table has 16768 32-bit entries. Each entry has three bytes for 6×4-bit soft data and an 8 bit value for the phase error.

256-Qam: Addressed by the most significant 8 bits each of Q then I. The table has 65536 32-bit entries. Each entry has three bytes for 8×3-bit soft data and an 8 bit value for the phase error. For 256-Qam demod, only the least significant 4 bits of the phase error are used. For preamble demod, all 8 bits of the phase error are used.

Digital Filter Design

There are two digital filters in the modem, Tx and Rx. The purposes of the two filters are different. The Tx filter prevents out-of-band transmissions while the Rx filter reconstructs the transmitted chip sequence and rejects out of band interference.

The Tx filter limits the bandwidth of the transmitted signal to a bandwidth around the chip frequency. The filter has a response similar to a root-Nyquist response also known as a Root-Raised-Cosine (RRC) response. The low-pass response must not contain images within the full sample rate of the transmit channel, 32 MHz. Therefore, the filter is of a multi-rate, interpolating design, taking input at the chip rate and up-sampling to 32 MHz. Further up-sampling and interpolation to 128 MHz is done in the AD9862 converter chip.

The Rx filter consists of two parts, a decimating FIR that down-samples the input 32 MHz sample rate to the chip rate and a Zero Forcing Equalizer (ZFE) that removes ISI.

The hardware implementations of the filters will allow for a wide variety of filter responses by merely changing coefficient tables. The coefficients themselves are determined with the aid of the zephyr.m Matlab routine. Table xx details the performance specifications.

Transmit sidelobes −60 dB
Receive Rejection −60 dB

Tx Filter Implementation

Because the filter is of a FIR type, the output is affected only by a limited number of chips, say N. Only N multiply-accumulates need to be calculated per filter output (multiplied by two for I and Q). The filter coefficients can be rearranged thus:

$$\begin{array}{c} \text{Oversample} \\ \phantom{x} \end{array} \cdots \begin{array}{ccccc} a_1 & a_{S+1} & \cdots & a_{(N-2)S+1} & a_{(N-1)S+1} \\ a_1 & a_{S+2} & \cdots & a_{(N-2)S+2} & a_{(N-1)S+2} \\ \cdots & \cdots & & \cdots & \cdots \\ a_{S-1} & a_{2S-1} & \cdots & a_{(N-1)S-1} & a_{NS-1} \\ a_S & a_{2S} & \cdots & a_{(N-1)S} & a_{NS} \end{array}$$

Chip

The dot product is formed between one row of the matrix and the current chip sequence to produce the output. On the next 32 MHz sample, the same chip sequence is dotted with the next row down. After all rows are exhausted, the chips are shifted over by one and the process is repeated from the top. The row selection counter is called the commutator.

This process works for all over-sample rates. The only difference between an 8 Mcps and a 256 Kcps configuration is the size of the coefficient table. The same number of multiply-accumulates are performed at the same 32 MHz rate. However, there are more rows to run through before the chips are shifted.

There are four distinct signal types produced by the transmitter: normal spread data, pilot tone, wedge, and AcqPack. All signal types pass through the same Tx Filter, although with some differences. Normal spread data, wedge, and AckPacks are all chip-based signals that differ only in their timing. The pilot tone is an oscillator operating at the chip rate.

To accommodate the timing adjustment needs of the Wedges and AckPacks as well as the frame timing adjust-ment, the filter commutator is designed to be reset on any 64 MHz boundary. The reset operation includes a flush of the shift register contents. (Caveat: this presupposes the Ad9862 can take shifts in I/Q timing. Otherwise, the filter commutator is will only be reset on a 32 MHz boundary. From a hardware perspective there is no difference because in that case the clocks per chips will be a multiple of 8.)

Wedge and AckPack Timing

When used as an interpolator, the filter acts as a pulse generator. The timing of the pulse is determined by the position of the commutator with respect to some nominal timing. The nominal timing of a frame is that of the normal spread data. The chip counter's clock sets the time at which the filter commutator is on the first row of coefficients. To produce pulses that are not aligned with normal spread data, the filter commutator is reset to the first row by a clock that is not aligned with the nominal clock.

An important consideration when altering the timing of the commutator is that the filter's output runs for as many chips as it has taps. In order for the filter to do its job of not producing spurious out of band signals, the filter commutator cannot be altered while there are non-zero values in the shift registers. Therefore, sufficient guard times must be allowed for between timing regimes. For example, if there are 16 pre-interpolation taps and the shortest spread length is 16 chips, then exactly one symbol time must be allowed between timing regimes. However, because the tails of the filter are so slight, it may be possible to clip the very last chip time if needed.

Wedge and AckPack signals consist of chip streams that are not aligned with the nominal timing. Both of these signal types have multiple timing offsets between their symbols. The aforementioned criteria of requiring guard time can be mitigated if the mis-timed symbols are separated by a full chip time. Then there is no timing adjustment, only a single chip of zero magnitude. For example, the wedge consists of two symbols, one a half chip early, the other a half chip late. This means there is exactly one chip time between then so no timing adjustment is needed from one symbol to the next.

Wedges are designed with only two offsets, +½ and −½. AckPacks are designed with only four offsets, 0, ¼, ½, and ¾ and are a total of 32 symbols long.

Letting N be chips per symbol, the format an AckPack is:

| Field Contents | Chips |
| --- | --- |
| Gap 2 symbols blank | 2 × N |
| Wedge00 6 symbols | 6 × N |
| Gap N + ¼ chips blank | .25 + 1 × N |
| Wedge25 6 symbols | 6 × N |
| Gap N + ¼ chips blank | .25 + 1 × N |
| Wedge50 6 symbols | 6 × N |
| Gap N + ¼ chips blank | .25 + 1 × N |
| Wedge75 6 symbols | 6 × N |
| Gap 3N − ¾ chips blank | −.75 + 3 × N |
| Total: | 32 × N |

Pilot Tones

Pilot tones are no different than normal spread data from a timing perspective. They are produced without spreading and are read from the buffer as 256-Qam data. The format of the pilot tones is covered in the section on Network Synchronization and Acquisition.

Rx Filter Implementation

The Rx Filter is composed of two parts, a decimating FIR and a Zero Forcing Equalizer. The decimating FIR is formed in a similar manner to the interpolating FIR used in the transmitter. In this case, each input sample at 32 MHz is multiplied by an entire row of the coefficient matrix. The vector of products is accumulated in a shift register with N taps, typically 16. As each successive sample comes in, the commutator selects the next row in the matrix and the resulting product vector accumulated in the shift register. Once all rows have been commutated through, the shift register shifts the accumulated product vectors over by one to produce the decimated output sample. Note that the shift proceeds to the left if the coefficients are arranged as in the following table. However, if the coefficient table is symmetric, the shift direction is irrelevant.

$$\text{Commutator} \begin{matrix} a_1 & a_{S+1} & \ldots & a_{(N-2)S+1} & a_{(N-1)S+1} \\ a_2 & a_{S+2} & \ldots & a_{(N-2)S+2} & a_{(N-1)S+2} \\ \ldots & \ldots & & \ldots & \ldots \\ a_{S-1} & a_{2S-1} & \ldots & a_{(N-1)S-1} & a_{NS-1} \\ a_S & a_{2S} & \ldots & a_{(N-1)S} & a_{NS} \end{matrix}$$

← Accumulator Shift Register

The zero forcing equalizer (ZFE) removes any ISI that was created by the Tx-Rx filter combination. Ideally this ISI is zero, but that can only be accomplished with poor performing true RRC filters. The filter is a standard type II FIR that forms the dot product of a shift register operating at the chip rate and a coefficient vector. The number of taps is determined by the amount of ISI rejection desired but is typically 31 taps.

Transmitter

The transmitter is capable of sending multiple cells at a time, each with its own constellation. By selecting one of four constellations, 4-Qam, 16-Qam, 64-Qam, and 256-Qam, a cell can be one of four sizes. The period of each cell remains the same. Multiple cells are transmitted by shortening and interleaving their symbols. Fields in the preamble of the cells indicate the interleave factor and the constellation. A set of cells to be interleaved and transmitted are called a frame.

The steps for transmission are as follows:

1. uP directs data cells through the FEC chip. The FEC chip performs a helical interleave and calculates a CRC and error correction bits. The output is a coded data cell.

2. Coded data cells are placed in buffer RAM. There may be one or many such cells at a time.

3. The preamble section of the coded data cells is modified to indicate the interleave factor and the constellation used.

4. The transmitter registers are programmed with the interleave factor.

5. When the frame begins, the hardware transmits the common preamble (AGC, interleave) using only the first code interleave.

6. The ModRate field (indicating constellation) is transmitted for every cell in the interleave.

7. The symbols of the coded data cells are interleaved and sent to the spreading circuit.

8. The spreading circuit produces a chip stream that is passed through the interpolating Tx FIR filter.

9. The sample stream is adjusted for gain and transmitter RF impairments and output to the ad9862.

From Cells to Symbol Stream

Coded data cells to be sent are placed in a RAM buffer. The cells will have been passed through FEC and are of four lengths: 1K, 2K, 3K and 4K bits (approximate, set by SymbolsPerCell register). The 1× cells will be read 2 bits at a time, the 2× cells 4 bits at a time, and the 4× cells will be read 8 bits at a time.

As the cells are read, they are interleaved. The interleave factor is set by the Interleave register which may take on values of 1 to 9 (or more). These values specify interleave rates of 1, 2, ..., 256 respectively. The cells may not all be of the same bit rate, but the symbol rate is constant. The symbol rate is set by the base (longest) code rate.

For example, an 8 Mcps chip rate and 512 spread sets a base symbol rate of 15.625 ksps. This is the rate at which each cell's symbols run. An interleave factor of 8 gives a merged stream of 125 ksps. The 1×, 2×, and 4× rates use 4-QAM, 16-QAM, and 256-QAM respectively, so the bit rates of individual cells vary.

Two bits per cell are needed for BitsPerSymbol on a per cell basis. Assuming a maximum allowed interleave of 128 in a 512 spread design, 256 bits of RAM are needed to specify the rates of every cell.

Here is an example:
Chip rate is 8.388608 Mcps
Spread 512
Base symbol rate 16 ksps
Max interleave is 256
4× cell is 4096 bits at 8 BitsPerSymbol.
2× cell is 2048 bits at 4 BitsPerSymbol.
1× cell is 1024 bits at 2 BitsPerSymbol.
Cells per second is 32 (interleave=1).
Cell period is 31.25 ms (all interleaves).
Max data rate for 256 interleave and 4× rate is 33 Mbps.
(Note: user rate is approx. ½ this because of framing, FEC, etc.)

Memory is organized as 256 by 512 bytes (128K bytes) to accommodate an interleave of 256 4× cells. There are two ping-pong buffers so the CPU can fill one set while another is being transmitted. The Memory Address bits 16 down to 9 define the cell and bits 8 down to 0 define the byte within the cell.

There are two hardware counters for producing the interleaved symbol stream. The first is the CellCounter and is the fastest. It counts off which cell to pull from. This counter rolls over according to the interleave factor which is always a power of two. When CellCounter rolls over, it clocks the SymbolCounter. SymbolCounter rolls over when it reaches the SymbolsPerCell value. Additionally, ChipCounter runs at the highest rate and clocks Cell Counter but is covered later.

Depending on the rate bits for the cell, The SymbolCounter will have some or all of its msbs mapped to the lsbs of the buffer address:

```
if the CellRate[x] is 8x, then
    SymbolCounter[8 downto 0] => MemAddr[8 downto 0];
    '000' => BitOffset;
else if CellRate[x] is 4x, then
    '0' => MemAddr[8];
    SymbolCounter[8 downto 1] => MemAddr[7 downto 0];
    SymbolCounter[0] => BitOffset[2];
    '00' => BitOffset[1 downto 0];
else if CellRate is 2x, then
    '00' => MemAddr[8 downto 7];
    SymbolCounter[8 downto 2] => MemAddr[6 downto 0];
    SymbolCounter[1 downto 0] => BitOffset[2 downto 1];
    '0' => BitOffset[0];
end
```

The combination of MemAddr and BitOffset will read the correct bits to be interleaved. Note that this technique can be extended to wider interfaces than byte wide. It only requires 2 bits times the maximum interleave plus some counters and combinatorial logic to implement.

Symbol Stream to Constellation

The symbol stream is mapped to I and Q values according to the constellation. The constellation used is driven by the BitsPerSymbol value. The following tables show how the bits are mapped. Note that the lsbs of the data go to the Inphase channel and the msbs of the data go to the Quadrature channel. It may be advantageous to implement the map with lookup tables. This would provide flexibility, but consumes more logic. The map output is 2 5-bit signed I/Q values. They will be scaled and processed prior to output to the DACs.

| Map  | 256-QAM         | 16-QAM     | 4-QAM |
|------|-----------------|------------|-------|
| m0 = | 1               | 1          | 1     |
| m1 = | u3^u2^u1^u0     | u1^u0      | u0    |
| m2 = | u3^u2^u1        | u1         | u0    |
| m3 = | u3^u2           | u1^u0      | u0    |
| m4 = | ~u3             | ~u1        | ~u0   |

| Real | Map   | 256-QAM | 16-QAM | 4-QAM |
|------|-------|---------|--------|-------|
| −15  | 10001 | 0000    | 00     | 0     |
| −13  | 10011 | 0001    |        |       |
| −11  | 10101 | 0011    |        |       |
| −9   | 10111 | 0010    |        |       |
| −7   | 11001 | 0110    |        |       |
| −5   | 11011 | 0111    | 01     |       |
| −3   | 11101 | 0101    |        |       |
| −1   | 11111 | 0100    |        |       |
| +1   | 00001 | 1100    |        |       |
| +3   | 00011 | 1101    |        |       |
| +5   | 00101 | 1111    | 11     |       |
| +7   | 00111 | 1110    |        |       |
| +9   | 01001 | 1010    |        |       |
| +11  | 01011 | 1011    |        |       |
| +13  | 01101 | 1001    |        |       |
| +15  | 01111 | 1000    | 10     | 1     |

Here are some examples:

| Data        | Q     | I     |
|-------------|-------|-------|
| 01000011'8  | 11111 | 10101 |
| 0001'4      | 10001 | 11011 |
| 01'2        | 10001 | 01111 |

Figures 5, 6:
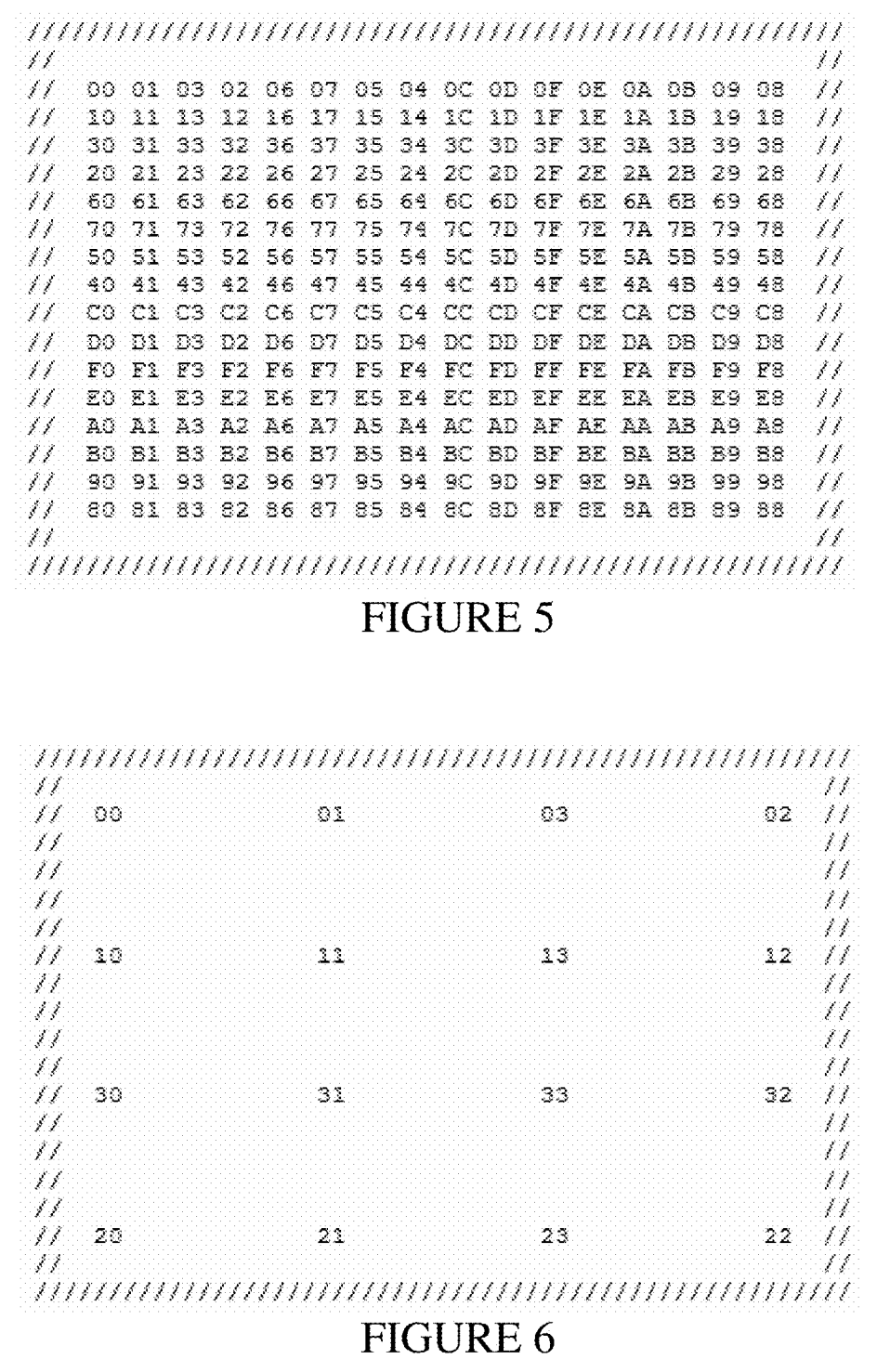
Figure 7:
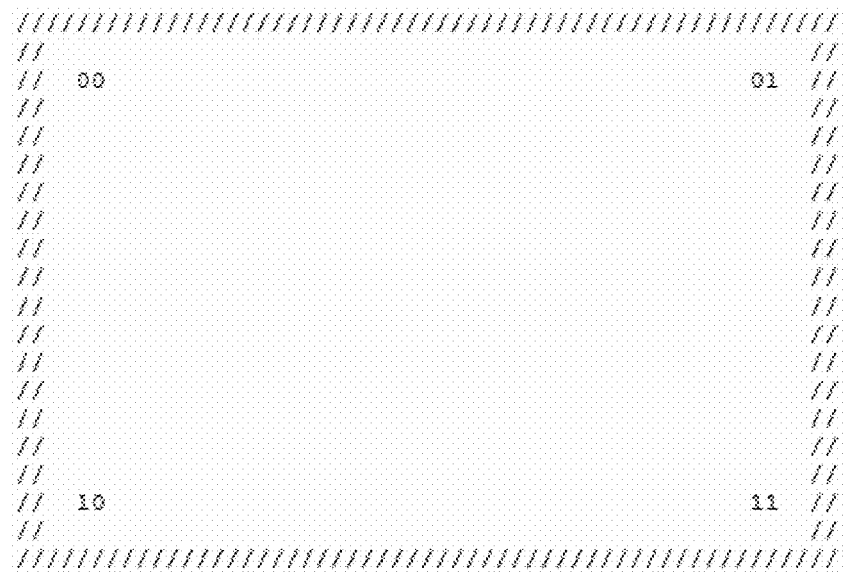
FIG. 7 shows a 4-QAM.

FIG. 5 illustrates 256-QAM (4×)
FIG. 6 illustrates 16-QAM (2×)
FIG. 7 illustrates 4-QAM (1×)

Constellation to Spread Stream

So far, clocking has occurred at a multiple of the chip period. Now the I and Q streams are multiplied by the OVSF code generator and then further multiplied by the Pn Scrambler. These operations may be combined.

The OVSF generator outputs either 0 or 1. If 0, (I,Q) is unaltered. If 1, (I,Q) (−I,−Q).

The Pn Scrambler produces one of four states:
Pn (I, Q)
00 (I, Q)
01 (−Q, I)
10 (−I,−Q)
11 (Q,−I)

The OVSF generator is programmed for the interleave factor so that all interleaved cells use the same shortened spreading code. The code is generated by the same XOR logic as the receiver without the enable signals. Only the lsb counter bits are used to produce the code so that it repeats.

Figure 8:
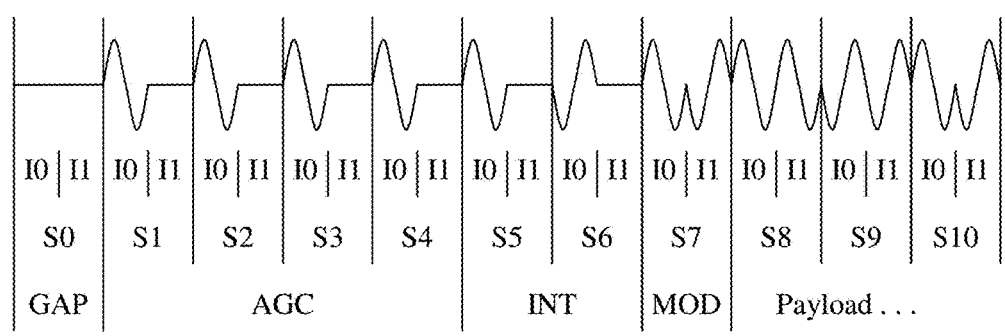
FIG. 8 shows signal amplitude for an example interleave.

There are times in the cell format where there is no transmitter output: the GAP and during portions of the AGC and INT fields. The GAP lies between cells and is an integral number of symbols. The INT field specifies the interleave factor. Because the correlators do not know a priori what the interleave factor is, they must correctly correlate this field in order to adjust the correlation enable circuitry for subsequent symbols. This is accomplished by having the transmitter only transmit the AGC and INT field symbols using the first interleave. The transmitter is silent during the remaining interleaves. FIG. 8 shows the signal amplitude for the beginning of an interleave 2 transmission. Note that the field lengths do not necessarily represent the actual format. Refer to the section on Cell Format for details.

Spread Stream to DAC Output

The spread I and Q streams have an offset added, separate I and Q gains applied, and a skew matrix multiplication. These operations will be used to correct for RF impairments in the transmitter.

Dynamic Range Calculations

Sufficient dynamic range must be present in the transmitter to drive a wide range of data rates and modulation schemes while meeting the filtering requirements. The receiver must have sufficient input dynamic range and sensitivity to reject out of band interferers while reconstructing the transmissions from many sources.

Signal and noise levels can be referenced to the maximum allowed power through the satellite. From this level, the uplink and downlink power can be calculated for a fully saturated channel (256-Qam in all slots) as well as for a single 4-Qam slot. This represents the total dynamic range along with headroom and resolution that needs to be handled by the system.

Satellite Transponder Capacity

Calculations can be done with respect to the power ceiling of the satellite transponder. It is assumed that any out of band interferers that fall within the receiver's IF filter will not exceed this limit. The limit is specified by the satellite operator as a combination of the Saturation Flux Density (SFD), the Equivalent Isotropic Radiated Power (EIRP), the input or output backoff and the ratio of purchased bandwidth to the transponder bandwidth. The limit may be calculated as the Power Spectral Density (PSD) according to:

The PSD specifies how many watts per Hz is allowed. It may be referred to the transmitter, receiver, or the transponder's input or output. The link budget determines the gain factors between each of these reference points. For example, the power-bandwidth product for a given satellite lease may be completely consumed by a transmitter with a large dish and power amp. Such a transmitter may produce 64 dBW EIRP into 10 MHz, to use an example. This amount of power is the ceiling referred to the transmitter. On the input to the satellite, this level becomes −142 dBW. The satellite will amplify this and transmit it at 48 dBW EIRP. The power level at the receiver will depend on the receiver's antenna and LNA configuration.

Signal Power

Let N be the number of chips per symbol and number of slots. The following definitions are for a non-interleaved, fully spread signal. The relative strengths given assume 4-Qam to have amplitude 8 and the minimum 256-Qam, 64-Qam, and 16-Qam amplitudes to be 1, 2, and 4 respectively. This is in contrast to the usual assumption that all constellations have minimum amplitude of 1.

| Pceil | | | power limit of the transponder |
| --- | --- | --- | --- |
| P0 | | | power of the preamble |
| Pmax | P0 | +5.46 dB | power of the loudest constellation point of 256-Qam |
| Pmin | P0 | −18.06 dB | power of the quietest constellation point of 256-Qam |
| P4 | P0 | | average power of 4-Qam |
| P16 | P0 | +0.97 dB | average power of 16-Qam |
| P64 | P0 | +1.18 dB | average power of 64-Qam |
| P256 | P0 | +1.23 dB | average power of 256-Qam |

There are two extremes for the maximum signal that can be incident on the satellite. At one end is a single transmitter fully interleaved N times thus occupying all slots. There is no spreading in this case. The maximum power is that of the largest constellation point of 256-Qam. The transmitter will have set its power level at N times P0.

At the other end is one slot per transmitter with N transmitters active. This case is a little trickier. The signals are weakly correlated which means it may not be correct to simply add power to get N times P0 or N times Pmax in the worst case. The weak correlation comes because although the phase angle between transmitters is arbitrary, it will align on occasion. The situation also occurs in a set of narrowband transmitters, but in that case, the phases align periodically for only single cycles of the carrier while for the spread spectrum case, they can align for an entire chip. Whether this is a problem remains to be seen. For the present, it can be assumed that some additional "peak to average" backoff may be necessary.

Once the power ceiling is determined, P0 is calculated as Pceil−10 log(N)−Pmax−"peak to average backoff". This is for a system that allows 256-Qam in all slots at once. For some systems that have lower average usage, the nominal power can be higher and an aggregate power control be used to keep within the transponder limits.

Transmitter Power

The transmitter can naturally fill the entire range of Pmax to Pmin in the DAC output. The number of slots and thus the range of RF power adjustment is set by the ratio of the available power to P0 referred to the transmitter. When interleaved, the transmitter boosts its output by 10 log (interleave). Note that because of the additional ~6 dB required to transmit 256-Qam, the transmitter may transmit 4-Qam in 4× the number of slots than can be transmitted in 256-Qam.

Receiver Dynamic Range

The receiver must handle not only the desired signal power but also adjacent signals on the transponder that fall within the ADC low pass filter. These signals are assumed to also be limited by the PSD requirement. The LPF can be adjusted in the tuner to be less than twice the bandwidth of the desired signal. This means only 3 dB of headroom is required.

The power ceiling referred to the ADC is then 3 dB less than full scale. Pmin is then FullScale−3 dB−10 log(N)−"peak to average backoff"−Pmax−Pmin. For a 512 spread system, this is about 60 dB, or 10 bits of amplitude leaving 2 bits of floor. The analog AGC will keep the signal in this range. This implies a quantization noise floor of ~6 dB relative to the minimum constellation point, or 25.6 dB relative to 256-Qam signal power. The fastest rate FEC requires ~20 dB, so there is sufficient headroom.

Modem Calibration

The Me510 Rev C modem is self-calibrated during boot. Calibration includes routines for verifying the functionality of various programming lines, hardware modules such as memory, and RF circuitry. The modules must come up in the correct order because some systems rely on others to work.

1. PCI Initialization

The PCI registers are configured to allow the Ixp to monitor the boot/calibration process. This is one-way communication. The Ixp has the opportunity to interrupt the process i.e. for rebooting with a new configuration.

2. RF Shutdown

The RF subsystems are programmed to shut down to prevent inadvertent transmissions. This should be defaulted by hardware, but it's a good idea for the software to do the same.

3. DAC

The AD977x TxDAC is used to double the TxBaseband clock. Before the DDS output can be checked, the TxDac must be readied.

4. 10 MHz Oscillator/Clocks

The four programmable clocks are all derived from either an OCXO or VCTCXO 10 MHz oscillator (the "XO") which is highly phase stable. The XO output is conditioned and buffered and provides a 10 MHz reference to the BUC and is passed through a 3rd harmonic tripler to provide a 30 MHz reference to the Rx and Tx dual DDS circuits. The XO has a Vtune pin accessible through the VCO_AD5624_CONFIG register (also used for the auxiliary monitor outputs). The Vtune pin is programmed nominally to mid-range. However, a future enhancement to the modem would be to preserve in flash the Vtune value that makes the oscillator match the network reference. This would be the starting Vtune value.

The two DDS circuits each create a baseband clock and an LO synthesizer reference. This allows the RF system to be configured for the widest range of applications, including separate rx/tx bandwidths, Doppler compensation, and precision phase alignment.

The clocks can be measured by the clock counter hardware in the FPGA. This hardware uses the 20 MHz oscillator input to count the period of a divided down programmable clock. The result is checked to see if the programmable clock is within part tolerance.

Not all clocks are directly accessible to the counter hardware. Specifically, the synthesizer references are only available as a diagnostic output on the LOCK pin of the PLL chips. Also, the Tx baseband clock passes through the DAC, where it is doubled, and so the DAC must be programmed first.

The sequence for programming/testing the clock subsystems is:

Tx DDS i. The TxDDS SPI wires are checked by writing and reading registers.

ii. Tx40 MHz

The 30 MHz input to the Tx synthesizer output is not directly measurable by the counter hardware. This clock will be verified later during the Tx Synthesizer calibration.

iii. Tx32 MHz

This clock drives the Tx baseband through the DAC which doubles it. It is programmable across 16 to 32 MHz. In order to measure the output, the DAC SPI ports must be functional.

Network Initialization and Acquisition

This section describes how the network is brought up from an empty state to having an established reference, how additional slave references are established, how a non-reference modem gains access, how synchronization is maintained, and how the recovery mechanisms work.

Synchronization Components

As detailed in the Channel Format section, a Superframe is divided into two parts, the Data Frames and the Sync Frame. Typically, there are 31 data frames per sync frame. This yields a superframe period of about one second. The Sync Frame is further subdivided into the SyncGap, the Pilot, and the AcqPack Period. The SyncGap is a short period of dead air just before the Pilot to aid in clearly identifying the Pilot time period. The Pilot is used to provide a signal that is loud enough to be always detectable. The AcqPack Period is where the references and remotes all transmit the various types of AcqPacks to finely measure and compensate for the individual satellite ranges.

Sync Period Fields

The fields of the Sync Period are as follows:

| Name | Symbols |
|---|---|
| Gap0 | 2 |
| Wedge1,2 | 2 |
| Gap1 | 2 |
| Pilot | 5gap+16tone+5gap |
| RefAcq | 32 |
| NormAcq | 32 × 14 |

This totals 512 symbols.

Gaps1,2, and Wedge1,2

A modem that is attempting to acquire the channel will use the gaps on either side of the wedges to identify the coarse timing of the frames. The gaps are two symbols long and provide a clear marker for the beginning of a frame. Note that the length and location of the gaps and wedges within the sync frame are the same as for the data frames.

To detect the start of a frame, the receiver takes the average power over a fraction (likely ¼ symbol) of each symbol period and stores this in an array of 512×oversample samples. During successive frame times, the receiver builds averages for each element in the array. The start of frame can then be easily located.

The two wedge symbols are transmitted at −½ chip and +½ chip off of the nominal chip time. The section on the Tx Filter describes how the timing is accomplished.

Pilot Tones

Pilot tones are transmitted by the reference modems and are used to establish the frequency offset of the receiver. The pilot tones do not require de-spreading. This is done because the deeply spread transmissions are far below the noise floor and require frequency lock in the receiver to de-spread. The Pilot tones are also used to gain coarse frequency lock. There is a separate pilot tone frequency pair for each of the four available reference slots.

Once a modem has identified the start of frame, a snapshot of the Pilot tones is taken and an FFT is performed. This provides the information necessary to adjust the tuning and obtain a coarse frequency lock.

During normal operation of a modem that has gained network access, the Pilot tones can be used to precisely track the frequency movement caused by satellite Doppler effects and local LNA variation.

Pilot tones are produced in the transmitter by a series of samples at the 16 times the symbol rate. The pilot tone period consists of 16 symbols for a total of 256 samples. For network configurations with more than 16 chips per symbol, the pilot tone samples are upsampled to the chips per symbol rate. These samples are passed through the Tx Filter to keep them band limited.

The pilot tone frequencies are determined by the reference number. Each reference modem produces two tones, a primary and a secondary. The primary tone is at DC and is transmitted using an orthogonal code. The secondary tone is sent at an offset from DC using the first of the orthogonal code. The orthogonal codes are 4 samples long and are applied repetitively to the rotating tone samples. The following tables show the tone and code assignments:

| | Primary | | Secondary | |
|---|---|---|---|---|
| Ref ID | Tone | Code | Tone | Code |
| 1 | DC | [+1 +1 +1 +1] | 4 | [+1 +1 +1 +1] |
| 2 | DC | [+1 +i +1 +i] | 9 | [+1 +1 +1 +1] |
| 3 | DC | [+1 +i −1 −i] | 15 | [+1 +1 +1 +1] |
| 4 | DC | [+1 −i −1 +i] | 22 | [+1 +1 +1 +1] |

The correlation mask to detect these frequencies +/−1 FFT point is:

[1 1 1 0 1 1 1 0 0 1 1 1 0 0 0 1 1 1 0 0 0 0 1 1 1].

Tone frequency determination is made in the following steps:

1. The receiver takes 256 samples during the pilot tone period. The sample rate is 16 times the symbol rate.

2. A 256 point FFT is taken for each of the orthogonal codes. Assuming a 16 KHz symbol rate, the resolution of the FFT is 1 KHz.

3. A vector of the sum of the magnitudes of all four FFTs is made.

4. The sum vector is correlated with the mask replicated four times at 0, 64, 128, and 192 KHz. This correlation determines the frequency offset to within one of the four replications.

5. The base code FFT is correlated with a single copy of the mask to determine which four of the four offsets is the true frequency offset. This yields the coarse offset to within +/−1 KHz.

6. A fine DFT is made that scans a narrow region around the coarse DC tone. This is done at 4× the sample rate and for each of the four orthogonal codes. The sum of the magnitudes of these scans is formed.

7. The peak of the fine scan is located using a threshold-gated differentiator zero crossing detector. The threshold is 75% of the peak value, the differentiator has 2 KHz separation, and the zero crossing is interpolated from the differential samples closest to the crossing.

The fine frequency offset determination made by this method is used to immediately adjust either the tuner IC or the NCO. The results of the method can be qualified by measuring the SNR of the FFT peak and requiring a minimum.

AcqPacks

AcqPacks are the means by which a modem can determine the precise baseband timing of the reference and its own transmission. AcqPacks are based on CDMA codes and are designed to be pseudo-orthogonal. In addition, they are transmitted with a slowly skewed timing that is used as a vernier for precise timing measurement.

Within the AcqPack Period, there are several types of AcqPacks that are transmitted:

RefAcqPack—These AcqPacks use one of the four pre-determined reference codes (RefAcqCodes). They are transmitted by the Primary and Secondary reference modems during the RefAqcPAck field. They are received by all modems as the baseband reference.

NormAcqPack—These use pre-assigned AcqCodes and time slots. There are 124 possible codes and 14 slots, thus the network supports 1736 online modems. These are used once a modem has gained access to the network for ongoing satellite ranging. Note that the reference modems must also use a NormAcqPack to verify its own timing relative to the primary reference, and in the case of the primary reference in case it loses its status.

RandAcqPack—These use one of a set of 128 RandAcqCodes that are not pre-assigned. These are used only during initial acquisition attempts by an unsynchronized modem. When transmitted, these can arrive any time in the AcqPack Period.

Normal Acquisition

When a modem comes up from a cold start, it must first gain receiver lock, determine the satellite range to ensure its transmissions are synchronous, then obtain a unique identifier that reserves the resources necessary to maintain synchronization.

The steps are:
1. Tune to the nominal center frequency of the channel.
2. Search for the SyncGap.
3. Sample the Pilot tone field.
4. Perform an FFT, measure the frequency offset, and correct the tuner.
5. Correlate and match the reference code in the RefAcqPack field.
6. Adjust baseband timing to lock to the reference.
7. Select random access code and transmit a trial RandAcqPack.
8. Measure the transmitted RandAcqPack and determine satellite range.
9. Poll for an available identifier (or use dedicated ID).
10. Begin transmitting successive NormAcqPacks using assigned code and slot.
11. Lock transmit timing offset and begin data transmission.

Primary Reference Acquisition

In a single reference system, or for the first reference that tries to gain access, there is no power in the channel. During the search-for-SyncGap step, all gain control settings will have been tried to find a signal. Assuming any other conditions are met that would otherwise bar transmission (e.g. the dish is known to be set up correctly) the modem transmits a pure frequency pilot tone. This is received and tuned to correct for frequency offsets. The modem then transmits a RefAcqPack using the primary RefCode. The modem then uses the received signal to determine satellite range and set up the proper delay between receiver timing and transmitter timing.

During this process, it is possible that another reference modem attempts the same thing.

Secondary Reference Acquisition

A modem that is designated as a reference may discover that there is already one or more references present on the system. Once it detects the first reference, it gains range and lock in the same manner as any other modem. Then the modem polls other reference modems to see which RefCodes are in use. Assuming one is available, it commandeers the RefCode and begins transmission of the secondary reference Pilot and RefAcqPack.

Channel Format

The channel is formatted into a Superframe which consists of two sections, the Frame Periods and the Sync Period. The Frame Periods are used during normal data transmission. The Sync Period is used for network acquisition and maintenance of synchronization. The details of the Sync Period are described in detail in the Network Initialization and Acquisition section.

SuperFrame Format

A SuperFrame consists of NumFrames number of equal time periods. In this Guide, NumFrames will be set at 32, although this may not be the best value for all implementations. The first NumFrames-1 (31) periods are used for data cells and the last period is used as the Sync Period. The Frame and Sync Periods are numbered starting at 0 up to NumFrames-1, with the Sync Period being numbered NumFrames-1.

The length of each period is determined by CellLength. The terms 'Frame Period', 'CellLength', and 'Cell Period', are all interchangeable. In this Guide, CellLength is taken to be 512 symbols long, although the actual value used in implementation may be different. Therefore, a SuperFrame is NumFrames*CellLength symbols long, or in this Guide, 32*512=16K symbols. For an 8,388,608 chips/second system with a length 512 spreading code, a SuperFrame is exactly 1 second long.

Ixp425—Nios Communications

Communication between the Ixp425 and the Nios processor consists of commands, status, and user data flows. All communications are conveyed over the PCI interface. The protocol is designed to insulate the Ixp from implementation details such as the Fec preamble and the location of configuration data.

PCI Interface

The PCI interface is a 32-bit, 33 MHz (66 MHz?), non-prefetchable target implementation and contains three BARs, eight mailbox registers in both directions, interrupt logic, and configuration registers. All access to the Control and Status Registers (CSRs) is from the Avalon side so the Ixp425 must use one of the BARs for access.

The addresses of the CSRs, interrupt control logic, and other details of the PCI interface component are found in the Altera PCI Compiler User Guide pages 7-75 to 7-88.

BARs

The BARs perform address translation between the Ixp address space and the Nios/Avalon address space. Other than modification of where BAR2 points during command execution, no special handling is required when moving data across the PCI interface. The BARs perform the address translation automatically.

The BARs are assigned as follows:

BAR1 points to the CSRs and enables Ixp access to the CSRs.

BAR2 is used during the data phase of a command, if applicable, and is altered to point to the targeted memory by the Nios during command processing. It is limited to a 1 kilobyte window. No hardware protection is afforded for data transfers smaller than this size.

BAR3 points to the FEC space and is used for user data flow. It is limited to a 1 kilobyte window. The window is divided in half, one for Rx flows and one for Tx flows. Transfers through this BAR are limited to single cell transfers in one of the four predetermined sizes.

Mailboxes

The mailbox registers are used for command and status blocks and for regulating user data flow through the Rx and Tx BAR 3. Some of the registers cause an interrupt when written. Configuration of the interrupt enables is the responsibility of the Nios during boot-up.

There are sixteen total mailbox registers, eight each for transfers from Ixp2Nios and Nios2Ixp. Full access for read and write to all registers is possible due to the open address map, but software on both the Ixp and the Nios limits access to the registers so they are only used in the intended direction. The exception to this limitation is when the command line debug processor in the Nios is active. It emulates the Ixp by directly writing to the Ixp2Nios mailbox set.

The mailbox registers are assigned as follows:

| | | | |
|---|---|---|---|
| Ixp2Nios[0] | IxpCmd[0] | Command block | ** causes Nios interrupt ** |
| Ixp2Nios[1] | IxpCmd[1] | Command block | |
| Ixp2Nios[2] | IxpCmd[2] | Command block | |
| Ixp2Nios[3] | IxpCmd[3] | Command block | |
| Ixp2Nios[4] | reserved | | |
| Ixp2Nios[5] | IxpAlarm | Out of band signal | ** causes Nios interrupt ** |
| Ixp2Nios[6] | IxpRxState | Rx flow control | ** causes Nios interrupt ** |
| Ixp2Nios[7] | IxpTxState | Tx flow control | ** causes Nios interrupt ** |
| Nios2Ixp[0] | NiosStat[0] | Status block | ** causes Ixp interrupt ** |
| Nios2Ixp[1] | NiosStat[1] | Status block | |
| Nios2Ixp[2] | NiosStat[2] | Status block | |
| Nios2Ixp[3] | NiosStat[3] | Status block | |
| Nios2Ixp[4] | NiosFrame | Current Tx and Rx frame numbers. | |
| Nios2Ixp[5] | NiosAlarm | Out of band signal | ** causes Ixp interrupt ** |
| Nios2Ixp[6] | NiosRxState | Rx flow control | ** causes Ixp interrupt ** |
| Nios2Ixp[7] | NiosTxState | Tx flow control | ** causes Ixp interrupt ** |

Interrupts

The Ixp may be interrupted by an error condition or by a Nios write to one of the interrupt enabled Nios2Ixp mailbox registers. The Ixp can read the PciInterruptStatus register to find the cause.

The Nios may be interrupted by an error condition or an Ixp write to one of the interrupt enabled Ixp2Nios mailbox registers. The Nios can read the AvalonInterruptStatus register to find the cause.

Command Protocol

The Ixp controls the modem by issuing commands to the Nios processor. The command protocol includes data and non-data transfer commands, out-of-band signaling for aborts and other uses, and boot-up and error recovery mechanisms.

Boot-Up

Initialization of the PCI component is the responsibility of the Nios processor during boot-up. Upon completion of the boot-up code, the Nios signals it is ready for communications from the Ixp by writing a special code to the NiosAlarm mailbox. The Ixp must wait for this signal before initiating commands or data flows to the modem.

Prior to boot-up completion and any time thereafter the Ixp may access the configuration registers of the PCI component. These allow the Ixp to identify the particular installed component.

Besides other boot-up routines such as memory checks, the Nios performs the following initialization steps related to the PCI component:

1. Clear the NiosStat mailboxes.

2. Point BAR 2 to a safe location to prevent accidental DDR DRAM overwrites by the Ixp.

3. Clear outstanding interrupts.

4. Enable interrupts for desired conditions.

5. Write boot-up status signal to NiosAlarm.

Command Protocol Elements

Commands may be of three types: Immediate, DataIn, and DataOut. Immediate commands have all the needed parameters passed in the IxpCmd registers. DataIn commands pass data from the Ixp to the Nios during a data phase. DataOut commands pass data from the Nios to the Ixp during a data phase.

Commands are processed through a series of states. Changes in state are signaled by writes to either IxpCmd[0] or NiosStat[0], as appropriate, and cause interrupts. The number of states depends on whether there is a data phase or not.

Some commands may take much longer to complete than most. An example is an InitiateRxLockAcquisition command that attempts to lock the receiver to the network reference. In such cases, the command completes before the desired result has occurred. This enables further commands to be executed while the lengthy process continues. To signal true completion or failure of the task, the Nios writes to the NiosAlarm mailbox.

For Immediate commands, the protocol is:

1. Ixp writes command parameters to IxpCmd[1-3].

2. Ixp writes command operation to IxpCmd[0], causing a Nios interrupt.

3. Nios processes command.

4. Nios writes returned status parameters to NiosStat[1-3].

5. Nios writes completion status to NiosStat[0], causing an Ixp interrupt.

For DataIn or DataOut commands, the protocol is:

1. Ixp writes command parameters to IxpCmd[1-3].

2. Ixp writes command operation to IxpCmd[0], causing a Nios interrupt.

3. Nios performs any pre-data phase operations.

4. Nios points BAR 2 to data location to transfer to or from.

5. Nios writes data phase ready status to NiosStat[0], causing an Ixp interrupt.

6. Ixp performs data transfer through BAR 2.

7. Ixp writes data phase completion signal to IxpCmd[0], causing a Nios interrupt.

8. Nios moves BAR 2 pointer to a safe location.

9. Nios performs any post-data phase operations.

10. Nios writes returned status parameters to NiosStat[1-3].

11. Nios writes completion status to NiosStat[0], causing an Ixp interrupt.

Rx and Tx Data Flow

The IP data packets are broken up into cells by the Ixp and then sent through the modem. When received, the modem sends the cells to the Ixp which then performs a reassembly of the original IP data packet. Cells can be one of four predetermined sizes according to the data rate desired.

Once the modem has been configured and the Rx and/or Tx channels have been synchronized, data can begin to flow. The flow of cells is governed by the NiosRxControl, NiosTxControl, IxpRxControl, and IxpTxControl mailbox registers.

When the Ixp has a single cell or multiple cells ready for transmission, the following protocol is used:

1. Ixp writes TxRequest to IxpTxControl, causing an interrupt of the Nios.

2. Nios prepares FEC to accept new cell. This may include waiting for a previous cell to exit the FEC chip.

3. Nios writes TxReady to NiosTxControl, causing an interrupt of the Ixp.

4. Ixp transfers data through BAR 3 to the FEC chip.

5. Ixp writes TxComplete to IxpTxControl if the cell was the last available. Otherwise, Ixp writes TxRequest to IxpTxControl to signal that the previous cell transfer is complete and a new one is available. The write causes an interrupt of the Nios.

6. Nios performs post-transfer processing.

7. If there are no more cells available, (i.e. IxpTxControl contains TxComplete), Nios disables NiosTxControl interrupts, writes TxComplete to NiosTxControl, and reenables NiosTxControl interrupts. This is to avoid an unnecessary interrupt of the Ixp.

8. If there are more cells available, (i.e. TxpTxControl contains TxRequest), Nios continues as in step 2 of this protocol.

When the Ixp is capable of receiving cells, the following protocol is used to transfer them:

1. Ixp writes RxReady to IxpRxControl, causing an interrupt of the Nios.
2. Nios performs any pre-transfer processing. This may include waiting for a new cell to be available from the FEC chip.
3. Nios writes a RxRequest to NiosRxControl, causing an interrupt of the Ixp.
4. Ixp transfers data through BAR 3 from the FEC chip.
5. If the Ixp desires to continue receiving cells, Ixp continues as in step 1 of this protocol.

AtMega Controller

The AtMega controller provides an interface for the LCD display, keypad, status LEDs, and the BUC and LNB power supplies. Communication with the AtMega is via an Rx/Tx serial communications port connected to the Fpga and accesible by the Nichi NIOS processor.

Current through the switcher is measured by a current sense IC and pass resistor. A voltage is generated and converted by the AtMega ADC.

The AtMega is responsible for monitoring the power supply current and disabling the switcher if an excess is sensed. If an excess is sensed, the Alarm LED is lit and an alarm is sent to the Nichi.

There are two modes of operation for the switchers. The first is during power up when the current will run higher than normal. The second is during normal operation which consumes less power. Commands to the AtMega will set the profile to be used when powering up the BUC and LNB.

Serial Communications

The tx/rx lines are connected to a uart port of the Fpga, accessible by the Nichi processor. The serial port settings are 56K Baud, 8,n,1. A command protocol is used for all communications.

There are several types of data sent between the AtMega and the Nichi. Note that in the following list it is not necessary for the Nichi to send two <cr> in a row. However, a <cr> will always place the AtMega in a ready-to-receive-a-command state. Also, the AtMega may transmit a <cr> at anytime and it will be ignored. This may be useful for debugging purposes. A <cr> is an ASCII '\r', decimal 13, hex 0xD.

| | |
|---|---|
| Reset | A <cr>Z<cr> sent by the Nichi at any time will cause a reset. Upon receiving a Reset, the AtMega will disable the BUC and LNB power supplies, clear the LCD and LEDs, empty the transmit buffers, and disable keystroke transmissions. Note that because a character may already be in the transmitter, it is possible for the Nichi to get a character after sending a Reset and before getting a response. The AtMega responds with a 'Z'. |
| Command | A Xxxx<cr> string is sent by the Nichi where 'X' is a special command opcode and 'xxx' are parameters specific to the command. The AtMega responds with yyyX where 'X' is the same as the command opcode and 'yyy' is a response specific to the command. |
| Alarm | At any time, the AtMega may transmit a 'Y' character to indicate an overcurrent sense has occurred. This alarm may interject within a command response and not otherwise disrupt it. No response from the Nichi is sent. |
| KeyDown | At any time, the AtMega may send a 'y' where 'y' is the lower-case letter corresponding to a depressed key. This KeyDown may interject within an ongoing command response. Optionally, the AtMega may implement auto-repeat of held keys. No response from the Nichi is sent. |
| KeyUp | <optional, to be implemented> At any time, the AtMega may send a 'Y' where 'Y' is the upper-case letter corresponding to a released key. This KeyUp may interject within an ongoing command response. No response from the Nichi is sent. |

Programming

The AtMega is programmed via J? using an AVR Dragon. <more details>

BUC and LNB Power Control

The BUC and LNB power supplies are implemented as SEPIC mode switchers. Both supplies operate in the same manner, but are sized appropriately for the required currents. The AtMega has two connections per supply, one for controlling the output voltage and on/off state, and the other for sensing the output current.

The output voltage is held in regulation by a resistor divider that provides x.xx volts to the switcher's feedback pin. Another input to the feedback pin from the AtMega allows a voltage generated by the AtMega PWM output to adjust the current flowing through the feedback resistor. This is used to set the output voltage of the switcher. In addition, when the PWM voltage falls below a predetermined threshold, the switcher is disabled.

The AtMega implements its output buffers as having three sources: a command response buffer, a keystroke buffer, and an alarm buffer. The round-robin main loop will select the next character to transmit with the high-low priority order of alarm-keystroke-response.

Following is a list of the commands from the Nichi and responses from the AtMega:

Reset Z<cr> As described above. The Nichi should not expect any characters after the response.
   xZ There may be leftover garbage (x) before the response, but not after.

Run z<cr> Latch the current keydown states. Begin transmitting keystrokes and enable LED and LCD updates.
   xxz The response starts with KeyDown characters for all keys that were latched down when the command was decoded. Note that keystroke buffering does not begin until after the final 'z' is sent.

Version V<cr> Get the version of the AtMega code.
   xxxV 'xxx' is a string of characters from the set [0.0-9] describing the version of the AtMega code.

BucVoltage Sxx<cr> Set the BUC output voltage to 'xx' which is always 2 decimal digits.

S The response is a single character.

BucSense T<cr> Get the BUC current sense.

xxxxT Responds with 'xxxx' which is always 4 decimal digits for the current in milliamps.

BucLimit Uxxxx<cr> Set the BUC current limit where 'xxxx' is 4 decimal digits for the current limit in milliamps.

U The response is a single character.

LnbVoltage sxx<cr> Set the LNB output voltage to 'xx' which is always 2 decimal digits.

s The response is a single character.

LnbSense t<cr> Get the LNB current sense.

xxxxt Responds with 'xxxx' which is always 4 decimal digits for the current in milliamps.

LnbLimit uxxxx<cr> Set the BUC current limit where 'xxxx' is 4 decimal digits for the current limit in milliamps.

u The response is a single character.

LcdRow1 1xx . . . <cr> Write to LCD row 1 where 'xx . . . ' is a string to write. The string may not be a full 40 characters in which case the AtMega should finish the row with blanks before responding.

1 The response is a single character.

LcdRow2 2xx . . . <cr> Write to LCD row 2 where 'xx . . . ' is a string to write. The string may not be a full 40 characters in which case the AtMega should finish the row with blanks before responding.

2 The response is a single character.

Led 3xxx<cr> Write to LEDs where 'xxx' is a string specifying the state of LEDs Alarm, Transmit, Receive respectively. The states are given as:

0 Off
1 Red
2 Green (Tx or Rx only)
3 Orange (Tx or Rx only)
3 The response is a single character.

Cursor Wr,cc,v<cr> Set cursor state according to the following:

r Row, either '1' or '2' cc Col, from '1' to '41' v Visible, either '1' or '2'

The column identifies the character position to the right of the cursor. <may have to be modified according to what's possible> <Also, if the cursor can take a bar or a block shape, that might be useful as part of the v specification.>

W The response is a single character.

AutoKey wx<cr> <optional, default is auto-repeat>

Set auto-repeat KeyDown (x=0) or KeyUp-KeyDown (x=1) mode.

w The response is a single character.

The following table lists the KeyUp, KeyDown characters sent by the AtMega. They were selected to be visible during debug and to be distinct from the command opcodes.

| | |
|---|---|
| A, a | 0 <space> |
| B, b | 1 <alpha> |
| C, c | 2 abc |
| D, d | 3 def |
| E, e | 4 ghi |
| F, f | 5 jkl |
| G, g | 6 mno |
| H, h | 7 pqrs |
| I, i | 8 tuv |
| J, j | 9 wxyz |
| K, k | +/− |
| L, l | '−' |

-continued

| | |
|---|---|
| M, m | Menu |
| N, n | eNter |
| O, o | lOad |
| P, p | uP |
| Q, q | dQwn |
| R, r | cleaR |

Although the description has been described with respect to particular embodiments thereof, these particular embodiments are merely illustrative, and not restrictive. Other embodiments may use other types of codes besides Hadamard (also referred to as Walsh, or Walsh-Hadamard). In some applications it may be possible to use code sets that are not perfectly orthogonal. Different embodiments can implement features described herein in different ways depending upon the processing resources available.

Any suitable programming languages can be used to implement the processing of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for improving spectral characteristics in a transmitted signal, wherein the signal is generated at least in part by using an Orthogonal Variable Spreading Factor (OVSF) matrix, the method comprising:
   determining that at least a portion of the OVSF matrix does not have a desirable spectral property; and
   modifying the at least a portion of the OVSF matrix with a sequence having an improved spectral property.

2. The method of claim 1, further comprising:
   using an exclusive OR function to modify the at least a portion of the OVSF matrix with the sequence.

3. The method of claim 2, further comprising:
   using an M-sequence of length N−1 and pre-pending a 1 to create at least a portion of the sequence.

4. An apparatus for improving spectral characteristics in a transmitted signal, wherein the signal is generated at least in part by using an Orthogonal Variable Spreading Factor (OVSF) matrix, the apparatus comprising:
   one or more processors;
   a tangible storage device including instructions executable by the one or more processors for:
      determining that at least a portion of the OVSF matrix does not have a desirable spectral property; and
      modifying the at least a portion of the OVSF matrix with a sequence having an improved spectral property.

5. A non-transitory processor-readable storage device including one or more instructions for improving spectral characteristics in a transmitted signal, wherein the signal is generated at least in part by using an Orthogonal Variable Spreading Factor (OVSF) matrix, the storage device comprising instructions for:
   determining that at least a portion of the OVSF matrix does not have a desirable spectral property; and
   modifying the at least a portion of the OVSF matrix with a sequence having an improved spectral property.

* * * * *